United States Patent [19]

Boeckmann

[11] 4,158,686

[45] Jun. 19, 1979

[54] METHOD OF MAKING A SOLAR ENERGY COLLECTOR

[76] Inventor: Alfred Boeckmann, Geigenbergerstrasse 19, D-8000 Munich 71, Fed. Rep. of Germany

[21] Appl. No.: 700,052

[22] Filed: Jun. 25, 1976

[30] Foreign Application Priority Data

Jun. 28, 1975 [DE] Fed. Rep. of Germany ....... 2529001

[51] Int. Cl.² .................. B29C 5/04; B29D 27/00
[52] U.S. Cl. .................. 264/45.7; 264/46.6; 264/250; 264/259; 264/267; 264/310
[58] Field of Search ...... 264/46.5, 46.6, 250, 264/251, 259, 255, 310, 311, 271, 46.7, 45.7, 46.4, 336; 126/270, 271

[56] References Cited

U.S. PATENT DOCUMENTS

| | | | |
|---|---|---|---|
| 2,998,006 | 8/1961 | Johnston | 126/271 |
| 3,076,450 | 2/1963 | Gough et al. | 126/271 |
| 3,426,110 | 2/1969 | Kesling | 264/45.7 |
| 4,010,733 | 3/1977 | Moore | 126/271 |

*Primary Examiner*—W. E. Hoag
*Attorney, Agent, or Firm*—Schwartz, Jeffery, Schwaab, Mack, Blumenthal & Koch

[57] ABSTRACT

Method for making a solar collector or converter, the converter comprising a series of at least three spaced wall members defining a plurality of flow passageways for the same or different heat exchange fluids, each passageway being in communication with a storage device for converted energy, preferably a multi-compartmented storage device having a separate compartment for each heat exchange fluid.

13 Claims, 3 Drawing Figures

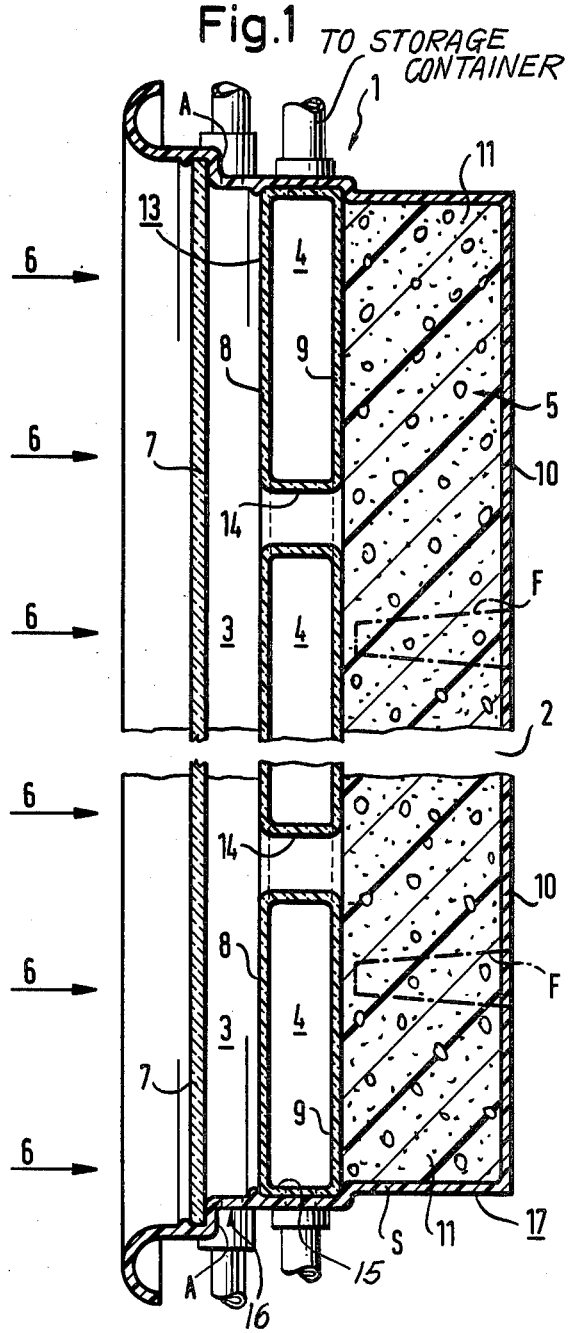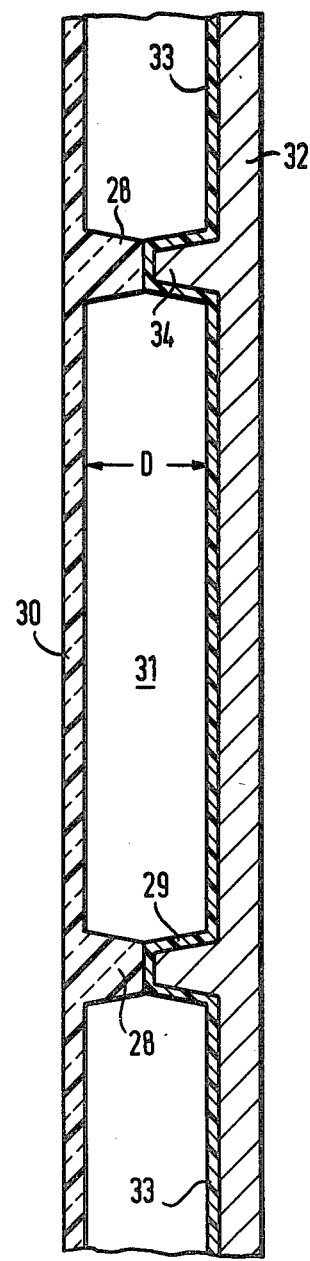

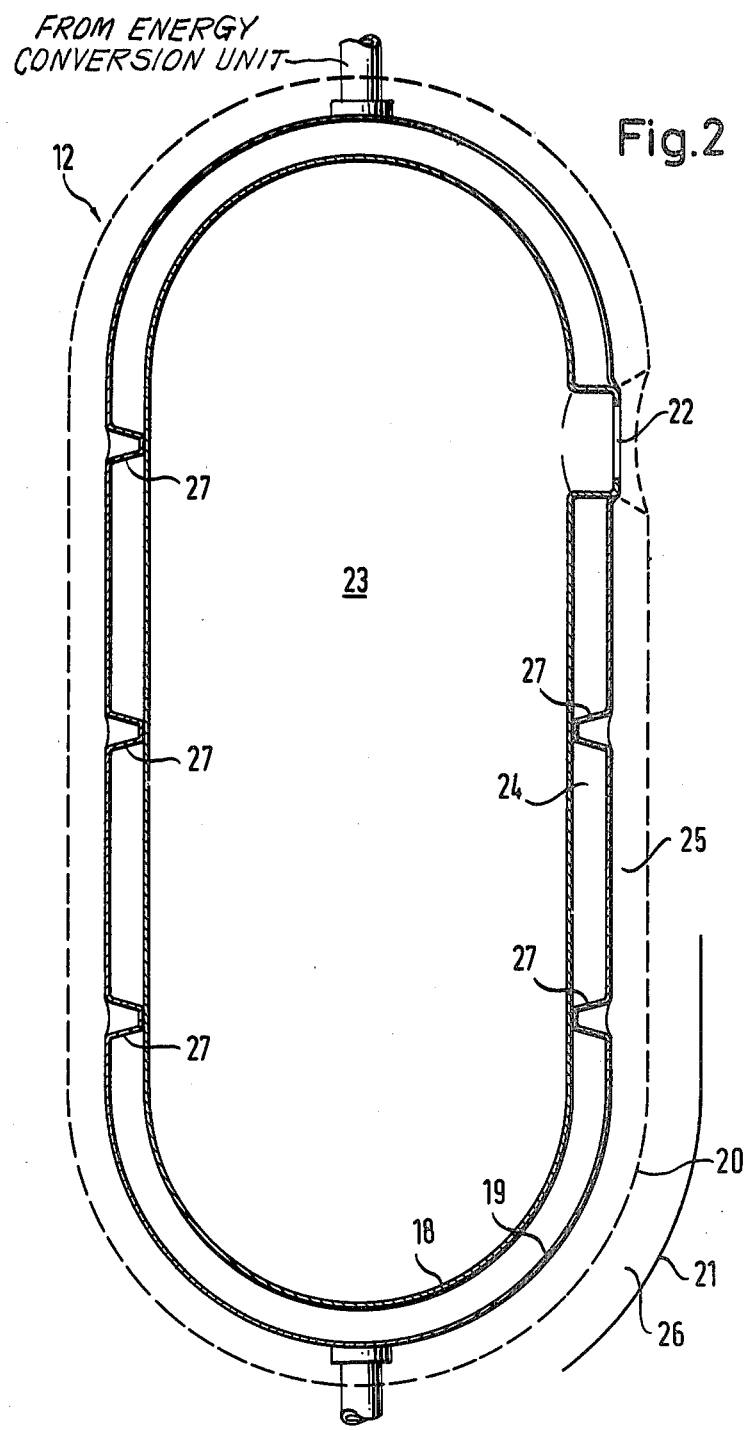

METHOD OF MAKING A SOLAR ENERGY COLLECTOR

BACKGROUND OF THE INVENTION

The present invention relates to a solar energy converter, and more especially, to a solar converter comprising a plurality of heat exchange fluid flow passageways in layered relationship coupled with a multi-compartmented energy storage device.

Recognition of the limited supply of fossil fuels, particularly inexpensive and ecologically sound fossil fuels, has led to increasing efforts to find and develop alternate sources of energy. Solar energy is the principal example of a source of energy which ideally meets all of the supply and environmental criteria; however, up until now there has not been available an economically-justifiable means of converting solar energy into useful energy. Photoelectric plates and the like are extraordinary expensive, and more fundamental units operating on a heat exchange principle have thus far proven to be uneconomical and/or inefficient.

SUMMARY OF THE INVENTION

It is therefore an object of the present invention to provide an improved solar energy converter.

It is also an object of the present invention to provide a solar energy converter having improved efficiency and a greater ease of manufacture.

Another object of the present invention resides in providing an improved solar energy converter having both an improved collection device and an improved storage device.

Still another object of the invention is to provide an improved method for manufacturing the subject solar energy conversion devices.

In accomplishing the foregoing objects, there has been provided in accordance with the present invention an improved solar energy converter comprising a first wall member of solar ray transmissive material, a second wall member spaced apart from the first wall member to define a first fluid flow passageway for a first heat exchange fluid, a third wall member spaced apart from a second wall member to define a second fluid flow passageway, separated by the second wall member from the first fluid flow passageway, for a second heat exchange fluid, and means for conveying the heat exchange fluids to a storage device. Preferably, the device further comprises a layer of insulating material backing the third wall member, and a generally hollow, preferably integrally formed containing means for the above defined structure. Advantageously, the first heat exchange fluid is a gas whereas the second heat exchange fluid is a liquid. The passageway space between the respective wall members is advantageously divided up into a plurality of smaller fluid flow passageways.

According to a further aspect of the invention, the solar energy converter comprises in combination with collector structure defined above a heat exchange fluid storage container comprised of a plurality of storage compartments, preferably arranged concentrically to one another and separated by concentrically arranged, spaced-apart walls, whereupon each heat exchange fluid may be conveyed to a separate storage compartment.

In yet another aspect of the present invention, there has been provided a method for producing the solar energy converter of the type defined above, comprising the steps of forming a first generally hollow structure including as walls thereto two of the spaced wall members of the collection device and therefore enclosing therewithin at least one liquid flow passageway for one of the heat exchange fluids, and thereafter forming, preferably by rotational casting techniques, a self-supporting hollow structure wherein the walls of the structure together with one wall of the first generally hollow structure define a closed container enclosing therewithin the first generally hollow structure as well as a chamber for the aforementioned layer of insulation.

Further objects, features and advantages of the present invention will become apparent from the following detailed description of preferred embodiments when considered together with the attached figures of drawings.

BRIEF DESCRIPTION OF THE DRAWINGS

In the drawings:

FIG. 1 is a cross-sectional view through a solar energy conversion device according to the invention;

FIG. 2 is a cross-sectional top view of a storage container according to the invention, with one layer illustrated by dashed lines and another optional wall layer illustrated by a partial solid line; and FIG. 3 is a cross-sectional view taken through two neighboring walls of a hollow structured device according to the invention, either of the type illustrated in FIG. 1 or FIG. 2.

DETAILED DESCRIPTION OF PREFERRED EMBODIMENTS

The solar energy converter according to the invention comprises at least one energy converter unit which is comprised of flow passages separated from one another for passage of one heat exchange medium through each respective flow passageway, whereby one of the heat exchange media is a liquid and the other is a gas or a liquid, and whereby in addition the flow-through passages are arranged in a layered relationship essentially in the direction of the impinging sun rays and are preferably capable of connection to respective storage compartments, preferably concentric to one another, of a storage container. A particularly advantageous design and a cost-favorable construction of this solar energy converter is possible in accordance with the invention by providing that one or more flow passageways and/or one or more storage compartments are arranged in a self-supporting hollow container structure which in addition to the outer walls thereof comprises one or more intermediate walls. These intermediate walls are arranged in spaced relationship from one another and define one or more flow passageways or storage compartments, respectively, which are separated from one another. Optionally, these intermediate walls also define compartments for optionally provided insulation material or for other special purposes. According to this construction, the walls of the hollow structure are also strongly and rigidly connected with one another and each individual compartment itself is manufactured in a rotational casting process in a closed condition and so as to be pressureless and without seams.

Referring now to the drawings, in FIG. 1 there is illustrated a cross section through an energy conversion unit 1, which is broken at point 2 since this energy conversion unit normally extends over a relatively large surface, the surface measurements of which are great in relation to the thickness of the device.

More particularly, the energy conversion unit 1 comprises a first flow pasageway 3 and a second flow passageway 4 as well as an insulation compartment and layer 5, each of the foregoing elements being arranged one above the other in layered relationship in the direction of the impinging rays of sun which is shown by the arrows 6.

The first flow passageway 3 is bounded on its side facing the sun rays of a wall member 7 of a material which is transmissive of solar rays and is preferably transparent. This wall can be formed, for example, of a synthetic resinous material, glass or any other suitable material. The flow passageway 4 is arranged behind the flow passageway 3 in the direction of the arrow 6 and is separated from flow passageway 3 by a wall 8. Finally, insulation compartment 5 follows in the direction of the arrow 6 upon the flow passageway 4, and the last two mentioned compartments are separated from one another by a wall 9. The insulation compartment 5 which is bounded by the structural wall 10 on the side opposite wall 9 can be provided with a layer of insulation material 11, for example, by filling the compartment with a foamed, heat insulating synthetic resinous material. In the flow passageway 4 is a liquid which serves as the first heat exchange medium and which is heated by the rays of the sun. In order to improve the heat exchange between the sun's rays and the liquid contained in the flow passageway 4, it is possible to color dull black at least the side of the wall 8 exposed to the sun's rays. In the flow passageway 3 there is located a second heat exchange medium which is preferably a gas, but which may also be a liquid. The two flow passageways 3 and 4 are connectable by means of pipe connections to either the same or different storage compartments of one or more storage containers, which can serve either as principle or intermediate storage devices. Preferably, the storage compartments are separate and are arranged concentrically to one another within the storage container. One embodiment of such a storage container 12 is illustrated in FIG. 2 and will be discussed in more detail hereinbelow.

The solar energy conversion unit 1 illustrated in FIG. 1 comprises a hollow body construction which includes a first hollow body 13 forming the first stage of completion of the entire hollow body design. This hollow body 13 is preferably a single piece and contains a single cavity, namely the flow passageway 4. Both walls 8 and 9 of the flow passageway 4 are connected together by means of spacing, cylindrical members 14, apart from the side walls 15. Preferably, the members 14 are formed integrally with the walls 8 and 9. The hollow body 13 which is comprised of the walls 8 and 9 as well as the side walls 15 and the spacing members 14 can be manufactured in a rotational casting process out of any conventional thermoplastic material. However, it is also possible to produce this hollow body 13 in any other known manner and from a variety of other materials which are bondable with thermoplastics and/or possess a bonding capability with respect to thermoplastics. The hollow body 13 is united with an open hollow body 17, which represents a tray-like supporting element which includes wall 10 and comprises the side walls S, the uniting step accomplished in a rotational casting process and leading to a unitary hollow structure design 16. The rotational casting process is well known and it is therefore not necessary to describe it further at this point. This hollow structure design 16, which is so to speak a multiple-cavity hollow body, comprises the already-mentioned walls 8, 9 and 10, which are arranged in spaced relationship with respect to each other, as well as the spacing members 14 and the side walls 15 and S.

Before beginning the rotational casting procedure with which the open hollow body 17 is to be formed, the hollow body 13 is layered or fastened into the properly prepared rotational mold, and a thermoplastic material in fluid or powder form is introduced into the rotational mold. The mold which is then heated causes the thermoplastic material to melt and the melted material is deposited on the inner wall of the rotating mold in which it is formed into the hollow body 17. In this way, the melted thermoplastic material also envelopes the edge regions of the hollow body 13, in particular, in such a manner, that the hollow body 13, is bonded inside of the hollow body 17. Thus, upon cooling the closed hollow body 13 is bonded inside of the open hollow body 17 in solidly and fluid-tight manner. Stem-like projections F selectively rising and/or jutting out into the hollow body 13 from the rotational mold, which is not shown in detail, also receive during the rotational casting process a coating layer of molten thermoplastic material which extends to wall 9 of the hollow body 13 and becomes bonded thereto, so that after cooling it forms a supporting connector between wall 9 and wall 10. It is also possible, however, to produce the open hollow body 16 separately as a hollow body in a rotational casting procedure and then when it is still in a heat-plastified condition, to place the hollow body 13 therein. This can be accomplished after melting of the material and rotation thereof in the rotating mold by stopping the rotation of the mold after a particular time, opening the mold and inserting the hollow body 13 in the heat-softened, open hollow body 17. The above-discussed wall 7 is held fast by a ledge A on the hollow body construction 16. By the use and arrangement of two or more transparent walls in spaced relationship from one another, there can be provided a plurality of heat transfer compartments for a heat exchange medium which is preferably a gaseous medium.

Reference is now made to FIG. 2 and to the storage container 12 illustrated therein, which may serve for example, as an intermediate storage device. This storage container 12 is comprised essentially of a hollow body construction which, considered from the inside toward the outside, has walls 18, 19, 20 and 21 spaced from each other in that order, whereby the last two walls are only indicated schematically, since the storage device may be formed, for example, only by walls 18 and 19 as well as by all of the walls. All of the walls 18 through 21 which in the illustrated embodiment have the form of concentric hollow bodies are produced sequentially from at least one thermoplastic material. In particular, this is accomplished in the same or a similar manner as that which has already been described in connection with FIG. 1. Initially, there is produced wall 18 which defines an inner-most compartment of the storage container, and this wall may optionally be provided with a man-hole 22. The manufacture is advantageously accomplished in a rotational casting process, and then in respective additional rotational casting steps carried out respectively in corresponding larger rotational molds, the walls 19 through 21 are produced. Thus, in this manner a total of 4 storage compartments 23, 24, 25 and 26 result, whereby the wall 21 defines the outer boundary of the storage device. Neighboring walls, for example, walls 18 and 19, can be bonded together by spacing elements 27, which, just as the spacing elements F in FIG. 1, are preferably in the form of truncated conical protrusions which are integrally formed with the respective wall. The spacing elements 27 are formed during the rotational casting of the wall and they are bonded simultaneously with the wall 18 by the flowing material utilized to form the wall 19, in the same manner as already described generally in connection with the spacing elements in FIG. 1.

As a modification of this method of bonding the walls, however, each wall 18 and 19, or every other wall of a pair of neighboring walls, can also include spacing elements 28 and 29, which are located oppositely of each other, as is shown, for example, in FIG. 3. In this manner, a wall 30, which is positioned further towards the inside and which is formed either in a rotational casting process or in another type of process, can contain the stem-like spacing elements 28 which protrude on the outer side of wall 30, preferably to a distance of half the thickness D of the hollow space 31 which is to be formed by the subsequent rotational casting process. Then, during the subsequent rotational casting process the corresponding, oppositely-positioned, stem-like spacing members 29 are produced integrally with and simultaneously with the next wall 32 by means of the rotational casting mold 32. In other words, the spacing elements 29 form a part of the wall 33. As already explained with respect to the spacing elements of FIG. 1, the molten thermoplastic material flows over the stem-like projections 34 provided on the rotational casting mold 32 in the direction of and up to the spacing element 28, whereupon a homogeneous bond is produced between the two spacing elements. After cooling of the two walls 30 and 33, these neighboring walls are strongly and rigidly bonded together and are held in this configuration. Like the spacing elements in FIG. 1, the spacing elements 28 and 29 and the stem-like projections 34 extend in a conically tapered manner from the respective wall into the hollow space bounded thereby.

Each rotational casting process takes place without the application of pressure and leads to seamless products which also in the case of the exemplary illustrated hollow body constructions 12 and 16, which are stacked inside of one another, require no special closures, flanges and/or seals, which is not the case in connection with the state of the art.

The walls 18 through 21 can be formed of the same thickness. It is advisable, however, alone on the basis of static considerations to decrease the thickness of the respective walls when proceeding from the innermost wall 18 to the outermost wall 21. Finally, a layer of foamed insulating material of a suitable synthetic resin may also be applied to the wall 21, for example, also in a rotational casting process.

If for any reason it is required to produce a hollow body construction 12 or 16 in separate parts, then these parts can be bonded together by welding to produce the respective hollow body construction.

The solar energy conversion device according to the invention is operated in a manner conventional for similar devices known in the prior art. The fluid heat exchange medium or media are circulated within the flow passageways for a period of time sufficient so that the temperature thereof increases to a desired value as a result of the solar rays impinging upon the device. Then, the heat exchange media are selectively transported to a suitable storage device such as the storage container illustrated in FIG. 2. The heat energy contained in the heat exchange media can be used either directly or indirectly to, for example, provide heat and/or hot water in a residence or other structure.

What is claimed is:

1. A method for producing a solar energy converter adapted for receiving the sun's rays on a solar side thereof and having at least one heat exchange medium flow passage defined by a first closed container having first and second generally planar wall members disposed transversely with respect to incident sun rays and circumferential side wall members connecting said first and second wall members around the circumference thereof, said first and second wall members being substantially parallel and spaced apart in the direction of the incident sun rays with said first wall member facing the solar side of the converter, at least one insulation chamber contiguous to said first closed container on the side of said second wall member, and a self-supporting unitary hollow structure having side walls and a bottom wall for containing said first closed container and said insulation chamber, wherein the side and bottom walls of said hollow structure and said first wall member of said first closed container define a second closed container enclosing therewithin at least one flow passage and at least one insulation chamber, said method comprising the steps of:
 (a.) forming said first closed container in the form of a generally hollow body including said spaced, parallel and generally planar first and second wall members and said circumferential side wall members, enclosing therewithin at least one of said heat exchange medium flow passages;
 (b.) positioning said first closed container in a rotational mold with the side wall members of said first closed container being contiguous to the sides of the mold; and (c.) rotationally casting a unitary self-supporting hollow structure having side walls and a bottom wall around said first closed container, thereby bonding the circumferential side walls of said first closed container to the side walls of said self-supporting hollow structure, thereby defining a second closed container between said first wall member of said first closed container and the side and bottom walls of said self-supporting hollow structure, said second closed container including said flow passage between said first and second wall members as well as an insulation chamber between said second wall member and the bottom wall of said self-supporting hollow structure.

2. The method of claim 1, wherein said first closed container comprises a one-piece body.

3. The method defined by claim 2, wherein said step of rotationally casting said self-supporting hollow structure around said first closed container, comprises:
 (a.) introducing a thermoplastic material into said mold;
 (b.) melting said thermoplastic material; and
 (c.) rotating said mold to cast said thermoplastic material around said first closed container in the shape of said self-supporting hollow structure.

4. The method of claim 2, wherein said step of forming said first closed container comprises rotationally casting said first closed container.

5. The method of claim 4, further comprising casting a synthetic resin foam in said chamber.

6. The method of claim 4, further comprising the steps of positioning in said rotational casting mold on the solar side of said first closed container in spaced relation and parallel to said first wall member at least one additional third wall member of a transparent material, with the edges of said third wall member being contiguous to the sides of said mold, and simultaneously rotationally casting said self-supporting hollow structure around said additional third wall member and said first closed container, thereby producing a solar energy converter having a plurality of heat exchange medium flow passages defined by said first closed container and the space enclosed by said self-supporting hollow structure between said first and third wall members.

7. The method as defined by claim 4, wherein said step of rotationally casting said self-supporting hollow structure includes the formation of a plurality of protrusions in the bottom wall of said self-supporting hollow structure, said protrusions extending into contact with said second wall member to act as supports.

8. The method as defined by claim 4, wherein said step of rotationally casting said first closed container includes the formation of a plurality of first protrusions extending from said second wall member in the direction of the sun rays, and said step of rotationally casting said self-supporting includes the formation of a plurality of second protrusions in the bottom wall of said self-supporting hollow structure, said second protrusions extending into contact with said first protrusions from said second wall member to act as supports.

9. The method as defined by claim 4, wherein said first closed container and said self-supporting hollow structure comprises a generally cylindrical cross section.

10. The method defined by claim 4, wherein said first closed container is rotationally cast as a one-piece, seamless body of a synthetic resinous material.

11. The method as defined by claim 10, wherein said step of rotationally casting said first closed container includes the formation of a plurality of integrally-formed spacing members extending between said first and second wall members.

12. A method for producing a solar energy converter adapted for receiving the sun's rays on a solar side thereof and having at least one heat exchange medium flow passage defined by a first closed container having first and second generally planar wall members disposed transversely with respect to incident sun rays and circumferential side wall members connecting said first and second wall members around the circumference thereof, said first and second wall members being substantially parallel and spaced apart in the direction of the incident sun rays with said first wall member facing the solar side of the converter, at least one insulation chamber contiguous to said first closed container on the side of said second wall member, and a self-supporting unitary hollow structure having side walls and a bottom wall for containing said first closed container and said insulation chamber, wherein the side and bottom walls of said hollow structure and said first wall member of said first closed container define a second closed container enclosing therewithin at least one flow passage and at least one insulation chamber, said method consisting essentially of the steps of:

(a.) forming by rotational casting said first closed container from a synthetic resinous material in the form of a one-piece generally hollow body including said spaced, parallel and generally planar first and second wall members and said circumferential side wall members, enclosing therewithin at least one of said heat exchange medium flow passages;

(b.) positioning said first closed container in a rotational mold with the side wall members of said first closed container being contiguous to the sides of the mold; (c.) positioning in said rotational casting mold on the solar side of said first closed container in spaced relation and parallel to said first wall member at least one additional third wall member of a transparent material, with the edges of said third wall member being contiguous to the sides of said mold;

(d.) rotationally casting a unitary self-supporting hollow structure having side walls and a bottom wall, around said first closed container and around said third wall member, thereby bonding the circumferential side walls of said first closed container and the edges of said third wall member to the side walls of said self-supporting hollow structure, thereby defining a second closer container between said first wall member of said first closed container and the side and bottom walls of said self-supporting hollow structure, said second closed container including said flow passage between said first and second wall members as well as an insulation chamber between said second wall member and the bottom wall of said self-supporting hollow structure, and thereby producing a solar energy converter having a plurality of heat exchange medium flow passages defined by said first closed container and the space enclosed by said self-supporting hollow structure between said first and third wall members; and (e.) casting synthetic resin foam in said insulation chamber.

13. The method of claim 12, including rotationally casting said foam.

* * * * *